United States Patent
Studnitzer et al.

(10) Patent No.: US 11,704,682 B2
(45) Date of Patent: Jul. 18, 2023

(54) PRE-PROCESSING FINANCIAL MARKET DATA PRIOR TO MACHINE LEARNING TRAINING

(71) Applicant: Chicago Mercantile Exchange Inc., Chicago, IL (US)

(72) Inventors: Ari L. Studnitzer, Northbrook, IL (US); David John Geddes, Antrim (GB); Inderdeep Singh, Palatine, IL (US); Steven Hutt, Sutton (GB); Bernard Pieter Hosman, Amsterdam (NL)

(73) Assignee: Chicago Mercantile Exchange Inc., Chicago, IL (US)

( * ) Notice: Subject to any disclaimer, the term of this patent is extended or adjusted under 35 U.S.C. 154(b) by 714 days.

(21) Appl. No.: 15/642,038

(22) Filed: Jul. 5, 2017

(65) Prior Publication Data

US 2018/0012239 A1  Jan. 11, 2018

Related U.S. Application Data

(60) Provisional application No. 62/359,007, filed on Jul. 6, 2016.

(51) Int. Cl.
*G06N 20/00* (2019.01)
*G06Q 40/04* (2012.01)
*G06N 3/08* (2023.01)
*G06N 3/044* (2023.01)
*G06Q 30/0201* (2023.01)
(Continued)

(52) U.S. Cl.
CPC ....... *G06Q 30/0201* (2013.01); *G06F 16/285* (2019.01); *G06N 3/044* (2023.01); *G06N 3/08* (2013.01); *G06N 20/00* (2019.01); *G06Q 40/04* (2013.01); *G06Q 40/06* (2013.01)

(58) Field of Classification Search
CPC combination set(s) only.
See application file for complete search history.

(56) References Cited

U.S. PATENT DOCUMENTS 5,761,386 A * 6/1998 Lawrence .............. G06Q 40/04
706/30
5,761,442 A   6/1998 Barr et al.
(Continued)

OTHER PUBLICATIONS

Abdulai, Abubakar-Sadiq Bouda.; "Predicting Intraday Financial Market Dynamics Using Takens' Vectors: Incorporating Causality Testing and Machine Learning Techniques"; East Tennessee State University. ProQuest Dissertations Publishing, 2015. 1605338. (Year: 2015).*

(Continued)

*Primary Examiner* — Scott L Jarrett
(74) *Attorney, Agent, or Firm* — Lempia Summerfield Katz LLC

(57) ABSTRACT

Systems and methods for pre-processing data to facilitate efficient and accurate machine learning are provided. The data may include market data. The pre-processing may include partitioning the data into windows assigning categories to windows generate a series of vectors. The series of vectors then being input into a computer system that executes a machine learning algorithm to efficiently train a neural network used to identify structure or patterns therein.

10 Claims, 6 Drawing Sheets

(51) Int. Cl.
  *G06F 16/28*     (2019.01)
  *G06Q 40/06*     (2012.01)

(56) References Cited

U.S. PATENT DOCUMENTS

| | | | | |
|---|---|---|---|---|
| 6,546,378 | B1* | 4/2003 | Cook | A61B 5/04012 |
| | | | | 706/12 |
| 6,604,158 | B1* | 8/2003 | Fallon | H04N 21/4334 |
| | | | | 710/68 |
| 7,251,629 | B1* | 7/2007 | Marynowski | G06Q 40/04 |
| | | | | 705/37 |
| 7,974,913 | B1* | 7/2011 | Morozov | G06Q 40/04 |
| | | | | 705/37 |
| 10,217,166 | B2* | 2/2019 | Bland | G06Q 40/04 |
| 10,776,691 | B1* | 9/2020 | Ghahramani | G06N 3/084 |
| 2002/0169703 | A1* | 11/2002 | Lutnick | G06Q 40/04 |
| | | | | 705/37 |
| 2002/0174081 | A1* | 11/2002 | Charbonneau | G06Q 40/04 |
| | | | | 706/15 |
| 2003/0076992 | A1* | 4/2003 | Banish | G06V 10/25 |
| | | | | 706/15 |
| 2003/0139957 | A1* | 7/2003 | Satchwell | G06Q 40/04 |
| | | | | 706/45 |
| 2005/0175252 | A1* | 8/2005 | Herre | H04N 19/126 |
| | | | | 375/E7.14 |
| 2006/0085286 | A1* | 4/2006 | Lutnick | G06Q 10/06 |
| | | | | 705/26.7 |
| 2008/0288329 | A1* | 11/2008 | Nannis | G06Q 40/04 |
| | | | | 705/36 R |
| 2014/0310201 | A1* | 10/2014 | Bland | G06Q 40/06 |
| | | | | 705/36 R |
| 2015/0100438 | A1* | 4/2015 | Malkin | G06Q 30/0277 |
| | | | | 705/14.73 |
| 2017/0091673 | A1* | 3/2017 | Gupta | G06N 5/022 |
| 2017/0091862 | A1* | 3/2017 | Cho | G06Q 40/04 |
| 2017/0213280 | A1* | 7/2017 | Kaznady | G06N 20/00 |

OTHER PUBLICATIONS

Ghazali, Rozaida; "Higher Order Neural Networks for Financial Time Series Prediction"; Liverpool John Moores University (United Kingdom). ProQuest Dissertations Publishing, 2007. U234482. (Year: 2007).*

Seliem, Medhat Louis.; "Foreign exchange forecasting using artificial neural network as data mining tool"; University of Louisville. ProQuest Dissertations Publishing, 2006. 1448632. (Year: 2006).*

Qian, Minglun.; "Neural network learning for time-series predictions using constrained formulations"; University of Illinois at Urbana-Champaign. ProQuest Dissertations Publishing, 2005. 3182358. (Year: 2005).*

One-hot definition Wikipedia.org, Retrieved Feb. 28, 2022 (Year: 2022).*

Mass, Andrew L. et al., Recurrent Neural Networks for Noise Reduction in Robust ASR Interspeech, 2012 (Year: 2012).*

EP3267385 EESR, Sep. 8, 2017.

* cited by examiner

PRE-PROCESSING FINANCIAL MARKET DATA PRIOR TO MACHINE LEARNING TRAINING

The present application claims priority to U.S. provisional patent application Ser. No. 62/359,007, filed Jul. 6, 2016, the entire disclosures of which is hereby incorporated by reference.

FIELD OF THE INVENTION

Embodiments of the invention relate to systems and methods for processing, organizing and searching data. More particularly, embodiments of the invention provide mechanisms for generating a series of vectors to represent market data. Other embodiments provide a market data search function that encapsulates the concept of searching over sequences.

Description of the Related Art

Machine learning is used to analyze trading data. A goal of machine learning is to find algorithms which can extract useful information from data sets which are typically too large for practical human analysis. In some machine learning systems algorithms are inspired by the functioning of the brain, resulting in the ability to find patterns in large and complex data sets. Machine learning can require extensive processing resources and time. As the amount of data increases, it can be difficult to perform machine learning in a timely manner with existing processors. It also becomes difficult to train machine learning systems as the amount of data increases. Without proper training, the utility of machine learning systems decreases.

Large scale analysis of patterns in financial data is not effective using current solutions. Individual analysts may miss complex patterns which are material for market behavior. Even with classical statistical models, assumptions such as linearity or low dimensionality may lead to limited or biased conclusions. Markets may evolve rapidly over time in response to changing economic circumstances and low dimensional models that posit specific dynamics can rapidly decrease in performance as the market moves away from the model hypothesis. Model choice is also a critical factor. Classical statistical models require significant initial assumptions regarding the structure of the market. The time and resources required in the model selection process may limit the ability to adapt models to new market conditions.

Trading entities produce market data in a raw format that participants (or their vendors) may pre-process into a form that suits algorithmic or visual analysis. Different analysis methodologies have different input data requirements. Such requirements go beyond simple format manipulation and are dependent on the nature of the analysis algorithm. Care is generally taken to ensure the data is presented to the learning algorithm in a form which encourages the computer or machine to learn structure in the data which is optimally useful for applications.

For example, some manual traders prefer to use a "price ladder" for efficient visual representation of order book depth at a specific point in time. Another example is a heat map of size on the order book, which enables visual analysis of complex temporal changes in resting orders on the order book. The representation preferences of algorithmic users of data are no different; some representations are more efficient in conveying information than others.

FIG. 2 illustrates an exemplary graphical user interface 200 that may be used to display market depth information and allow traders to trade financial instruments. Graphical user interface 200 includes a price and quantity grid 202. Price and quantity grid 202 may contain five columns. A buy column 204 displays a user's working buy order quantities. As used herein, a user may be a trader. A hit column 206 displays the market bid quantities. Prices for individual rows are displayed in a price column 208. A take column 210 displays market ask quantities. And, a sell column 212 displays a user's working sell order quantities. Individual entries may be color coded to assist users in quickly interpreting the displayed information. For example, entries in buy column 204 and hit column 206 may be in blue and entries in take column 210 and sell column 212 may be in red.

Systems for market data search may be based on the manual specification of data "features." For example, a search may be based on pre-defined features such as volatility or liquidity, or features specifically chosen with reference to the selected request period. The common factor in these approaches is the requirement for manual specification of features and that the definition of features is made without reference to the statistical distribution of the underlying data. This is analogous to the previous generation of image search tools, which required manual pre-specification of a class of interesting image features. Implementing this approach with computer systems can result in a time consuming and error prone process.

There is a need in the art for improved systems and methods for processing and organizing data that will be used by machine learning computers while efficiently using processing resources to help produce better results. There is also a need for improved a market data search functions.

SUMMARY OF THE INVENTION

Embodiments of the present invention overcome at least some of the technical problems and limitations of the prior art by providing systems and methods for processing and organizing data. In some embodiments, the invention provides mechanisms for pre-processing market data that will be used by machine learning systems. The pre-processing may include generating a series of vectors to represent market data and may efficiently use processing resources while also improving the results of the machine learning process.

Other embodiments of the invention include a data processing system and search algorithm that identifies historical market data periods that are similar to an input request from a user. The input request may be a historical period of market data defined by a contract, a start time and an end time. The search algorithm will return other historical periods which exhibit similar patterns of order flow, including similar patterns displayed by other markets/contracts. The system may return multiple matching periods ordered according to their machine defined similarity to the request.

In various embodiments, the present invention can be partially or wholly implemented on a computer-readable medium, for example, by storing computer-executable instructions or modules, or by utilizing computer-readable data structures.

Of course, the methods and systems disclosed herein may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
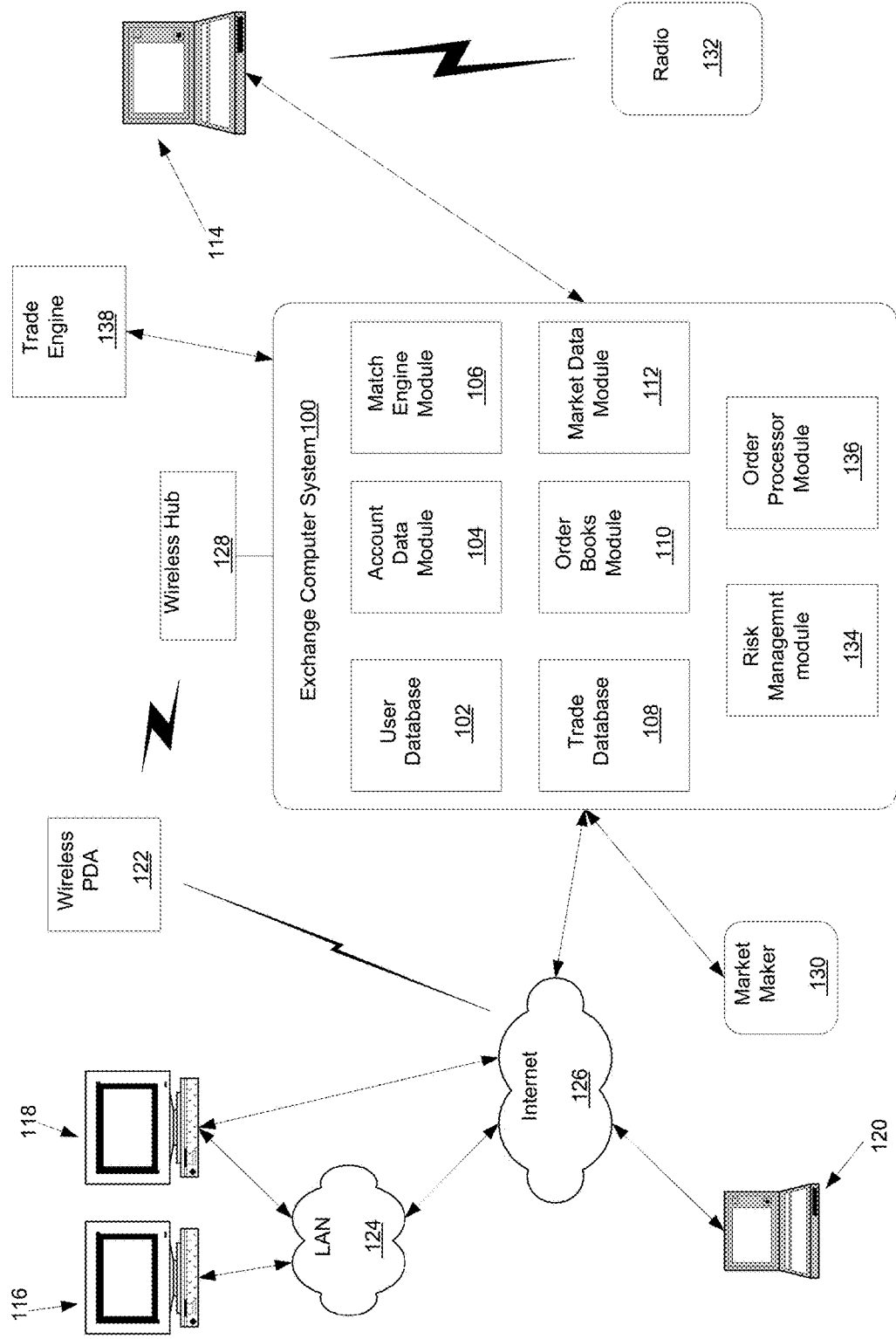
FIG. 1 shows a computer network system that may be used to implement aspects of the present invention.
Figure 2:
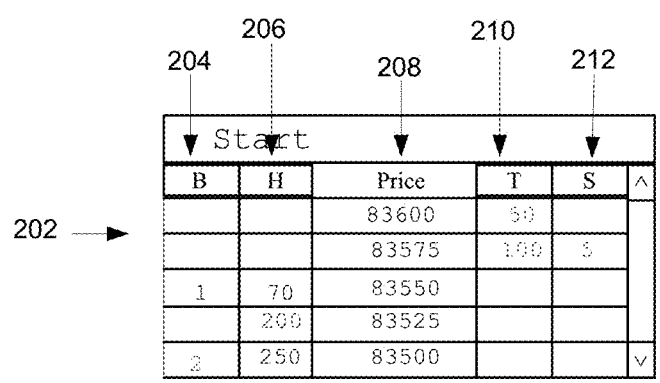
FIG. 2 illustrates an exemplary graphical user interface that may be used to display market depth information.

Aspects of the present invention are preferably implemented with computer devices and computer networks that allow users to exchange trading information. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Pre-Processing of Data

Machine learning is a methodology that may be used to identify structure in data. For example, sequences of related events (i.e. contiguous in time and price) in a limit order book are often of interest, whereas small changes in a limit order book may be regarded as noise. Machine learning can require a lot of processing resources, particularly when large amounts of data are analyzed. The accuracy of the learning process can also be reduced as the size of the data increases.

Some embodiments of the invention include a pre-processing process prior to machine learning. The disclosed pre-processing processes reduce processing requirements during the machine learning process. The disclosed pre-processing processes also allow machine training algorithms to generate accurate results.

Pre-processing balances filtering irrelevant data (noise) with retaining relevant data (that could potentially contribute to a signal). For example, the analysis of patterns in order books requires decisions on which order book changes are key and how to represent those changes. Without pre-processing of data, the machine learning machine may waste computational time and resources learning details which are not of interest. Proper pre-processing increases the efficiency of the operation of a machine learning computer or machine.

Figure 4:
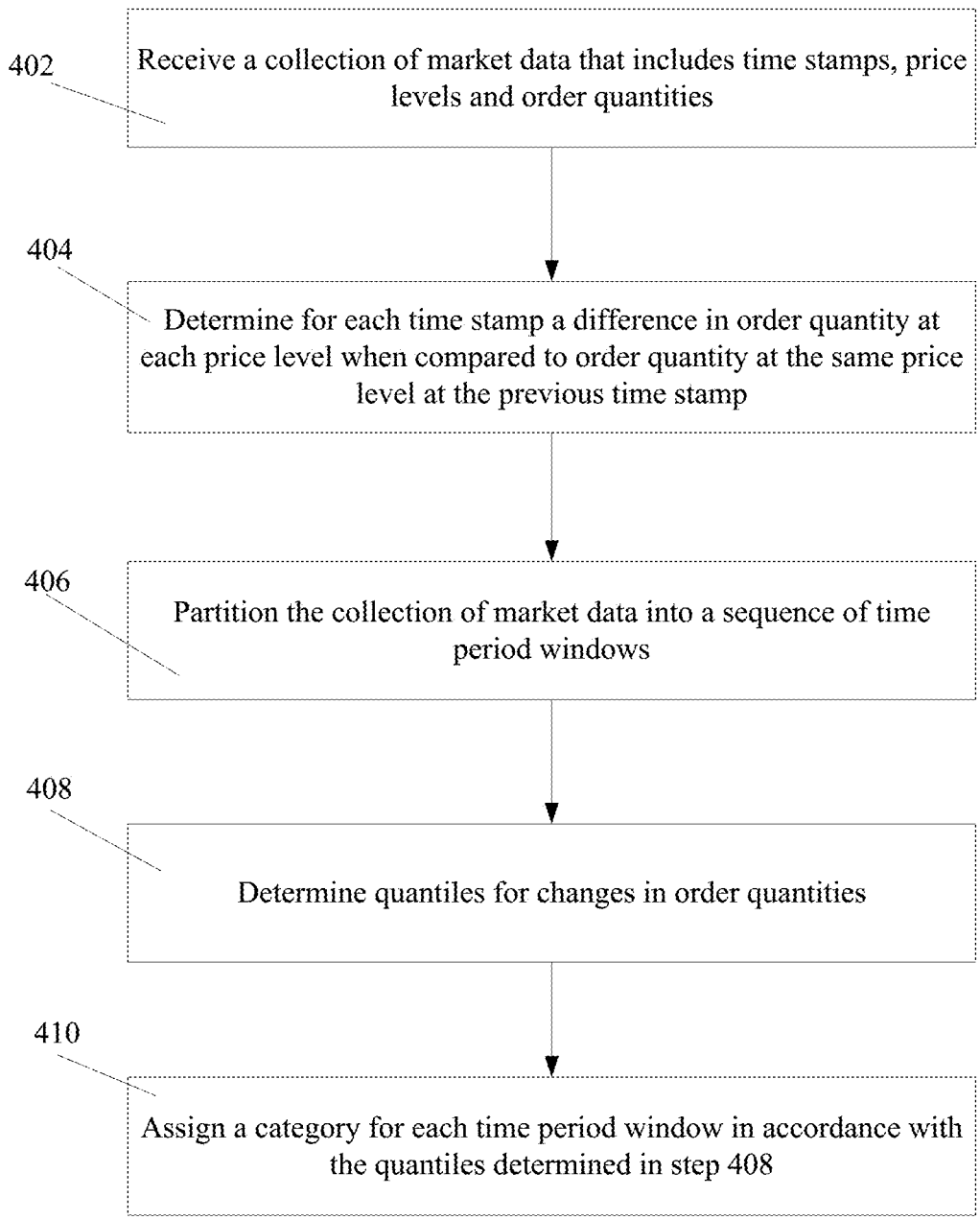
FIG. 4 illustrates a process for pre-processing data in accordance with an embodiment of the invention.

An exemplary process for pre-processing data is shown in FIG. 4. The pre-processing may be performed, at least in part, with a computer that has been programmed with computer-executable instructions to carry out the pre-processing. The raw data is pre-processed in several stages. Each row of the raw data may include a snapshot of the state of the limit order book at a given time stamp, consisting of order quantity at price levels above and below BBO. First, in step 402 a collection of market data is received. The market data may include time stamps, price levels, order quantities and/or other market data information. The market data may be received at a computer device from one or more order books. Next, in step 404, for each time stamp a difference in order quantity is determined at each price level when compared to order quantity at the same price level at the previous time stamp. In some embodiments utilizing differences in order quantity instead of order magnitudes leads to more accurate machine learning results.

Next, in step 406 the collection of market data is portioned into a sequence of time period windows. Each window being a fixed number of consecutive rows. The size of the window can be adjusted, and may be set to a size that can encompass a pattern or structure within the market data. After the data has been partitioned, quantiles for changes in limit order quantities are determined in step 408. The quantity quantiles may be computed for a period prior to the beginning of a window. These quantiles may be used to determine quantity change categories. For example, the categories may be "large increase," "large decrease," and "small increase or decrease."

Finally, in step 410 a category may be assigned for each time period window in accordance with the quantiles determined in step 408. An exemplary set of categories includes:
  a. large increase in ask order quantity
  b. small increase/decrease in ask order quantity
  c. large decrease in ask order quantity
  d. no order quantity
  e. large decrease in bid order quantity
  f. small increase/decrease in bid order quantity
  g. large increase in bid order quantity In accordance with some embodiments of the invention, these seven categories are represented as a 7-dimensional, one-hot binary vector. This final form of the data used as input to training the machine learning machine follows:
  1. N windows consisting of:
  2. P price levels×T timestamps, each of which is a:
  3. 7-dimensional one-hot binary vector.

Figure 3:
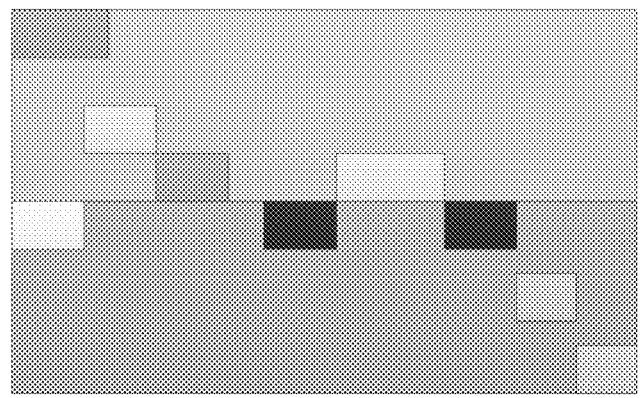
FIG. 3 illustrates a visualization of a single window in accordance with aspects of the invention.

For the purposes of visualization, a single window may be represented as shown in FIG. 3.

In some embodiments of the invention, the pre-processing results are used by a computer system that executes a machine learning algorithm. The machine learning process may involve training a neural network, such as a recurrent neural network (RNN), as needed.

Market Data Searching

Financial market data may be viewed as closer to a video than an image. Financial exchanges receive incoming order flow which may be FIFO processed by a matching engine. The matching engine reports each change in the Limit Order Book with a timestamp. Hence market data can be represented as a time series or a sequence of events. Each event updates the state of the Limit Order Book.

Some embodiments of the invention allow a user to specify a historical period of market data defined by a contract, a start time and an end time. This 'request' period is a 'snapshot' of the market data that occurred in the past. The user will then request a search for other historical periods which exhibit similar patterns of order flow, not necessarily on the same contract. The search will return a selection of historical periods, so called 'matching' periods. Both 'request' and 'matching' periods are presented to the user in a visual representation of the data. Request periods may be ordered according to their machine defined similarity.

Figure 5:
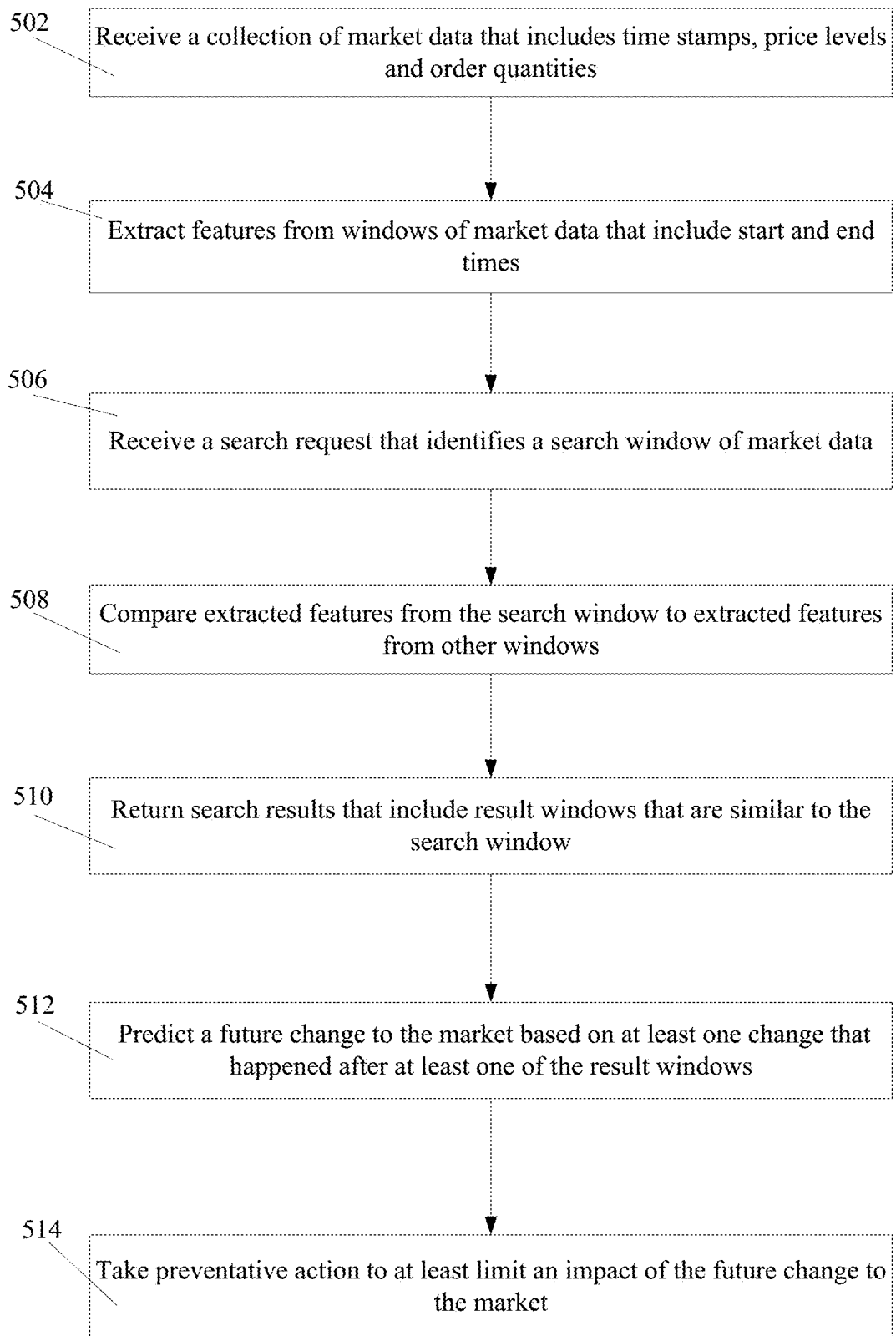
FIG. 5 illustrates a method of searching market data in accordance with an embodiment of the invention.

Embodiments of the invention include a system for searching market data based on historic market data patterns. FIG. 5 illustrates a method for searching market data in accordance with an embodiment of the invention. First, in step 502 a collection of market data is received. The collection may be received at a computer system that executes a training algorithm. The received market data may consist of a set of market snapshots, which may be uniquely indexed by a pair of characteristics: contract symbol and time stamp. The market data may include time stamps, price levels, order quantities and/or other market data information. The market data may be received at a computer device from one or more order books. The time stamp may provide a unique ordering on market snapshots and implies a sequence structure for market data. Each market snapshot may include the following data: 1. resting quantity at n levels above/below best ask/bid; 2. best ask/bid price; and 3. contract tick size. Alternative embodiments may include additional data or less data.

Next, in step 504 features are extracted from windows of market data that include start and end times. Step 504 may include one or more of the pre-processing steps described above. In one example, feature extraction can be done by a computer executing computer-executable instructions and that uses a neural network specifically adapted for the statistical structure of market data. Once trained, the system may provide a feature mapping from sequences of market snapshots to a so-called feature space. The feature space may be a lossy encoded compression of the sequence. In other words, compression of sequences of market data snapshots removes "noise" in a market data sequence and retains the "signal", i.e., the unique features of market data behavior that make up the feature space. A sequence of market snapshots may be mapped to a point in the feature space. The feature space allows for a distance metric to be calculated between any two points in the feature space.

A search request that identifies a search window of market data is received in step 506. The search request may be manually created by a trader or exchange employee. In some embodiments the search request may be created by a computer system executing an algorithm.

A search is performed in step 508 by comparing the extracted features from the search window to extracted features from other windows. The search function may be implemented as follows in some embodiments of the invention:
1. The system uses feature mapping to map a 'request period' to a 'request point' in feature space. This is done by first pre-processing the raw data, as described above, and then compressing the processed data. Compression of this data results in a representation of features that are unique or display some level of structure or pattern. The more structure the data has, the more it can be compressed. The search compares the compressed search query features to all other features in the feature search set.
2. The search algorithm ranks points in the feature search set according to their distance from the 'request point'. Specifically, the search query is a point in n-dimensional space, and the other points in the feature search set representing historical features can also be represented as points. The distance between the request point and all the other points in the feature space can be computed.
3. The nearest 'n' points in the feature set are returned with ranking.

In some embodiments, the search process is as follows:
1. User identifies a contract and period of interest known as the 'request period'. This normally will be submitted as a time slice of "raw" market data, i.e., market data in the same format which is generally received from the exchange or other market data provider.
2. The 'request period' is passed to a software application.
3. The system searches for 'matching periods' with similar patterns to the 'request period'.
4. The system returns a ranked list of 'matching periods'. The shortest distance between the points is considered most similar (highest ranked)

Figure 6:
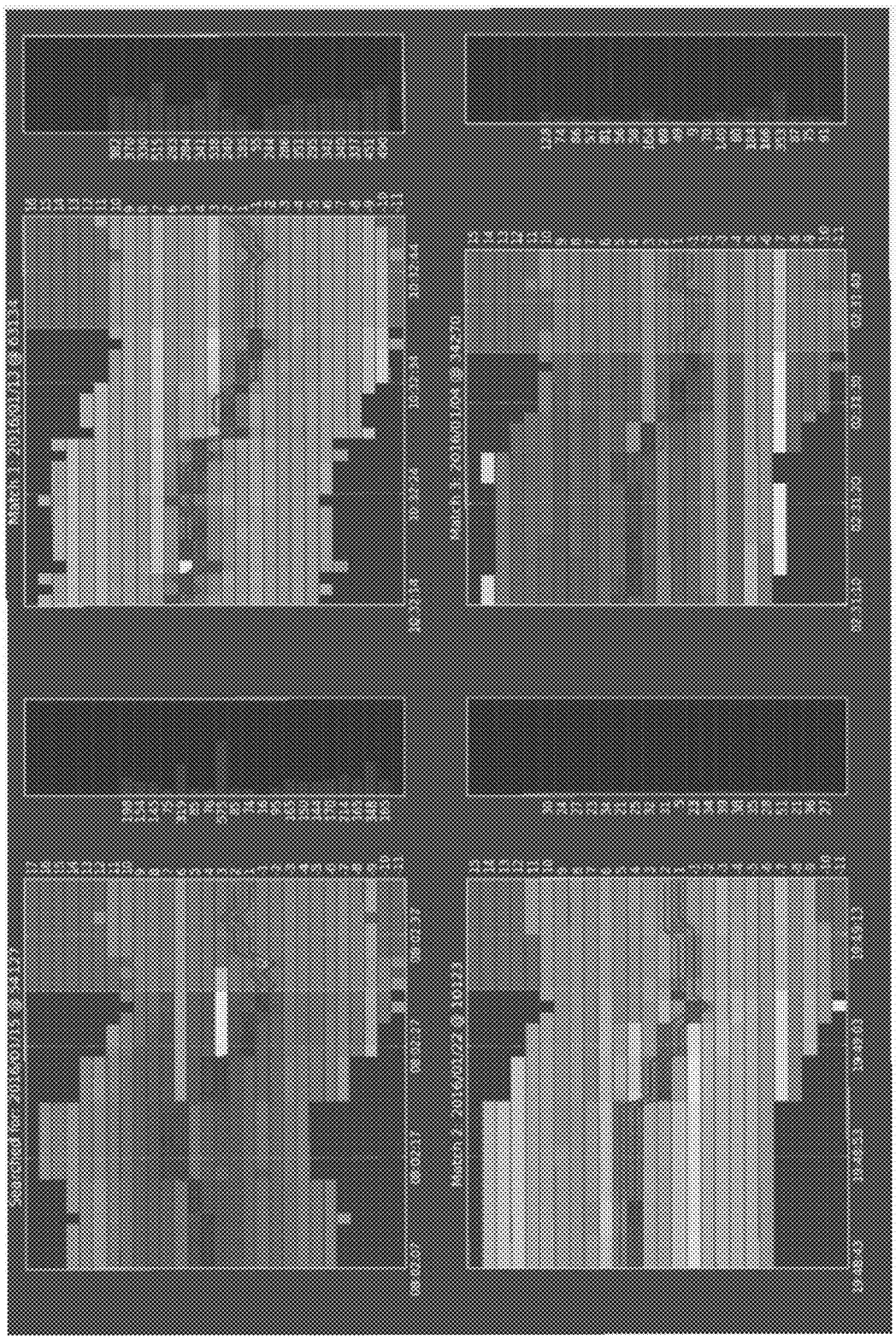
FIG. 6 illustrates an exemplary search window and search results in accordance with an embodiment of the invention.

After the search is performed, search results are returned that include result windows that are similar to the search window in step 510. For the purposes of user interaction, a sequence of market snapshots may be returned in a visual representation. An exemplary representation is shown in FIG. 3. For example, with a visual representation the horizontal axis may represent increasing time stamp and the vertical axis quantity at levels above/below the best ask (green)/bid(blue). Intensity of color may represent quantity size. Other visual representations are also appropriate. FIG. 6 illustrates an exemplary search window and search results in accordance with an embodiment of the invention.

Step 512 includes predicting a future change to the market based on at least one change that happened after at least one of the result windows. Step 512 may include predicting a liquidity event or any other condition of impacting price discovery. In some embodiments, step 512 may include predicting changes that are of interest to traders, such as changes in values of contracts or indexes. Step 514 preventative action may be taken to at least limit the impact of the predicted future change to the market. The preventative action may include pausing a market, suspending an account, halting trading and other actions taken by an exchange to limit or end an undesired market condition.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention. All are considered within the sphere, spirit, and scope of the invention.

The invention claimed is:

1. A computer system comprising:
 a processor;
 a tangible computer-readable medium containing computer-executable instructions that when executed by the processor cause the computer system to pre-process a collection of raw market data for use by a machine learning computer by performing the steps comprising:
   (a) receiving, from a client computer via an electronic communication network, a collection of raw market data that includes time stamps, price levels and order quantities, the collection of raw market data characterized by a first size;
   (b) determining, for each time stamp, a difference in order quantity at each price level when compared to order quantity at the same price level at the previous time stamp;
   (c) partitioning the collection of raw market data into a sequence of time period windows, comparing order quantities prior to a time period window to order quantities within the time period window, and determining quantiles for changes in order quantities;
   (d) dividing the determined differences into predefined portions, each of which is characterized by one of a plurality of categories, each category being assigned to the time period window in accordance with the division of the determined differences and the determined quantiles;
   (e) generating a new pre-processed data set comprising the sequence of time period windows, each of which includes a multi-dimensional one-hot binary vector encoding of the plurality of categories representative of each price level and time stamp therein, the new pre-processed data set characterized by a second size less than the first size;
   (f) transmitting the new pre-processed data set as input to a computer system that executes a machine learning algorithm, wherein the execution of the machine learning algorithm includes training a recurrent neural network to identify structure in the pre-processed data and executing a lossy encoded compression to compress the sequence of time period windows to provide a feature mapping from the sequence of time period windows to a feature space, wherein the lossy encoded compression of the sequence removes noise from the sequence of time period windows while retaining the unique features of the feature space; and
   (g) outputting the compressed sequence of time period windows to a display for user interaction.

2. The computer system of claim 1, wherein (c) comprises:
 selecting a length of the time period windows to reveal patterns in market data.

3. The computer system of claim 1, wherein (c) comprises:
 selecting a length of the time period windows to reveal structures in market data.

4. The computer system of claim 1, wherein (d) further comprises:
 classifying changes in order quantities that are large and small increases and decreases.

5. The computer system of claim 4, wherein (d) further comprises:
 analyzing order quantity changes over multiple windows.

6. The computer system of claim 1, wherein (d) further comprises:
assigning a category for each time stamp within a time period window in accordance with the divisions determined in (d).

7. The computer system of claim 6,
wherein the categories comprise:
large increase in ask order quantity, small increase/decrease in ask order quantity, large decrease in ask order quantity, no order quantity, large decrease in bid order quantity, small increase/decrease in bid order quantity and large increase in bid order quantity,
and wherein the categories are represented as a 7-dimensional one hot-binary vector.

8. A computer implemented method comprising:
(a) receiving, from a client computer via an electronic communication network by a processor of a computer system, a collection of raw market data that includes time stamps, price levels and order quantities, the collection of raw market data characterized by a first size, wherein the processor is coupled with a tangible computer-readable medium containing computer executable instructions executed by the processor to pre-process the collection of raw market data for use by a machine learning computer;
(b) determining, by the processor, for each time stamp a difference in order quantity at each price level when compared to order quantity at the same price level at the previous time stamp;
(c) partitioning, by the processor, the collection of raw market data into a sequence of time period windows, comparing order quantities prior to a time period window to order quantities within the time period window, and determining quantiles for changes in order quantities; and
(d) dividing, by the processor, the determined differences into predefined portions, each of which is characterized by one of a plurality of categories, each category being assigned to the time period window in accordance with the division of the determined differences and the determined quantiles;
(e) generating, by the processor, a new pre-processed data set comprising the sequence of time period windows, each of which includes a multi-dimensional one-hot binary vector encoding of the plurality of categories representative of each price level and time stamp therein, the new pre-processed data set characterized by a second size less than the first size;
(f) transmitting, by the processor, the new pre-processed data set as input to a computer system that executes a machine learning algorithm, wherein the execution of the machine learning algorithm includes training a recurrent neural network to identify structure in the pre-processed data set and executing a lossy encoded compression to compress the sequence of time period windows to provide a feature mapping from the sequence of time period windows to a feature space, wherein the lossy encoded compression of the sequence removes noise from the sequence of time period windows while retaining the unique features of the feature space; and
(g) outputting, by the processor, the compressed sequence of time period windows to a display for user interaction.

9. The computer implemented method of claim 8, wherein (d) further comprises:
classifying, by the processor, changes in order quantities that are large and small increases and decreases.

10. The computer implemented method of claim 8, wherein (d) further comprises:
assigning, by the processor, a category for each time stamp within a time period window in accordance with the divisions determined in (d), and
wherein the categories comprise:
large increase in ask order quantity, small increase/decrease in ask order quantity, large decrease in ask order quantity, no order quantity, large decrease in bid order quantity, small increase/decrease in bid order quantity and large increase in bid order quantity,
and wherein the categories are represented as a 7-dimensional one hot-binary vector.

* * * * *